June 14, 1938. C. A. OTTO 2,120,507
TEMPERATURE REGULATION
Filed Aug. 8, 1936
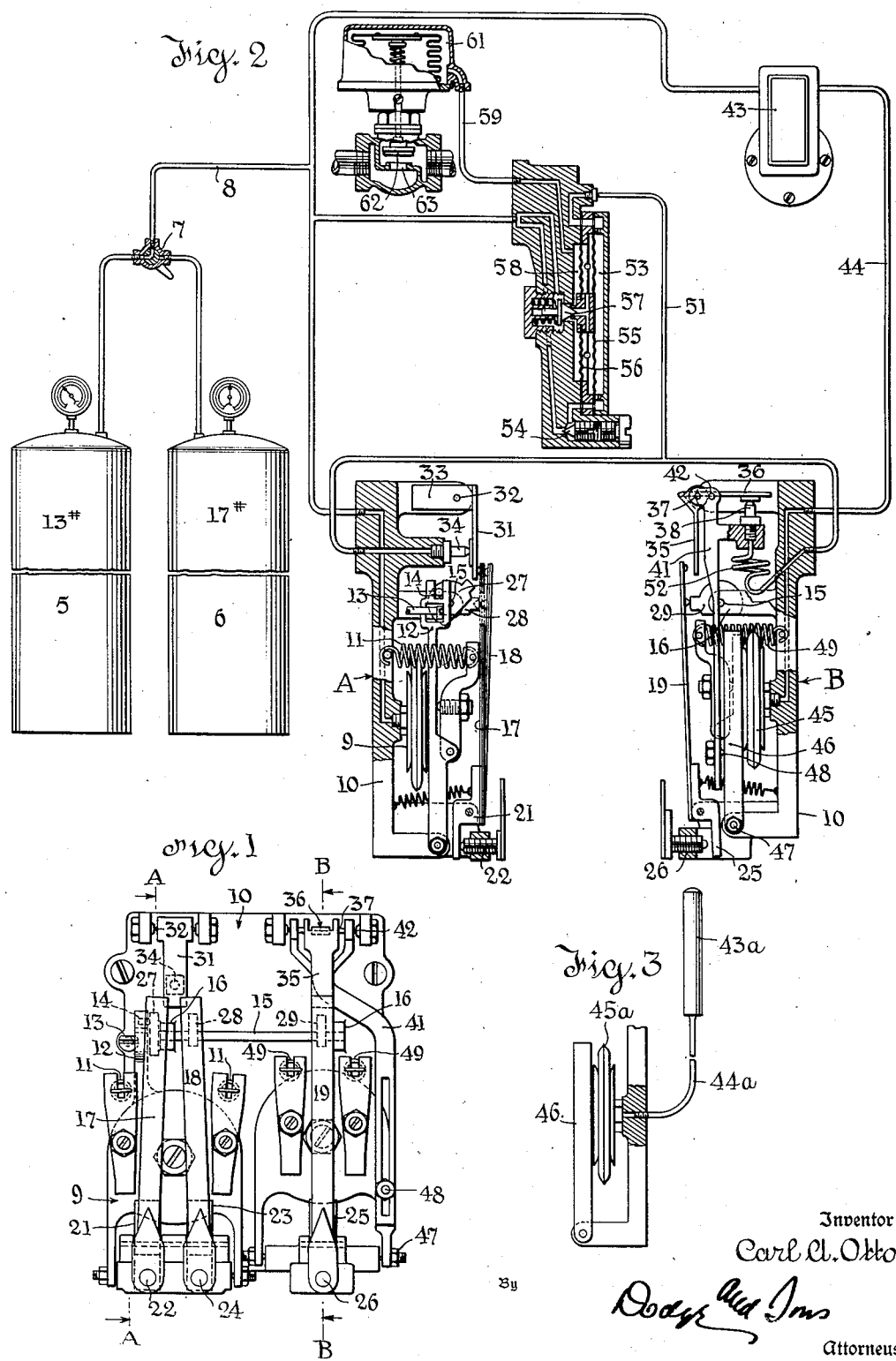
Inventor
Carl A. Otto
By
Attorneys Patented June 14, 1938

2,120,507

UNITED STATES PATENT OFFICE 2,120,507

TEMPERATURE REGULATION

Carl A. Otto, Milwaukee, Wis., assignor to Johnson Service Company, Milwaukee, Wis., a corporation of Wisconsin Application August 8, 1936, Serial No. 95,013

10 Claims. (Cl. 236—1)

This invention relates to temperature control devices and particularly to thermostats adjustable from a remote point to maintain at least two different temperatures. It is particularly applicable and will be described as applied to thermostats of the pneumatic leak-port type, though not limited thereto.

In the patent to Fortier No. 1,597,350, August 24, 1926, is described a thermostat in which selection between two functionally similar, but differently adjusted thermostats, is made by changing the pressure of air supply. In the patent to Otto No. 2,021,263, November 19, 1935, there is disclosed a thermostat in which selection between two functionally diverse (oppositely acting) and if desired, differently adjusted, thermostats, is made by changing the pressure of air supply.

The Fortier device is chiefly intended for establishing different temperatures under day and night conditions, whereas with the Otto device the prime field of utility is the selective control of heating and cooling media by the same control system and even by the same flow controlling valve.

The present invention coordinates features of the two prior patents to produce a single instrument with a single adjusting means capable of maintaining either of two temperatures under heating conditions, and of maintaining another and wholly independent temperature under cooling conditions.

The independence of the temperature under cooling conditions is such that it may either be substantially constant and subject to manual adjustment, or may vary with outdoor temperature, being less than outdoor temperature by a number of degrees determinable by manual adjustment of the instrument.

Generally stated, the remotely adjustable thermostat comprises three thermostatic elements, a day element for heating control, a night element also for heating control, but effective at a lower temperature than the day element, and an element for cooling control. A single pressure responsive selector renders the second and third elements inoperative while the first is operative, and the first inoperative while the second and third are operative. The second and third do not conflict when both are operative for the device is so contrived that the second does not become active under heating conditions until temperature reaches a low value, say 55° and then causes supply of heat, whereas the third does not become active until temperature reaches a high value, say 80° and then causes the abstraction of heat. Between these temperatures both are inactive. The outdoor conditions at the time heat is available and the outdoor conditions when cooling is available are such that indoor temperature will never tend toward the effective range of the wrong thermostatic element.

An embodiment of the invention using the pneumatic leak port principle and a single intermediate type (i. e. progressively acting) relay will be described since it is the preferred form. Control equipment for one room is shown, but multiple systems embodying a remotely adjustable thermostat, relay and flow controlling valve for each of a plurality of rooms are contemplated and involve mere duplication of these elements.

In the drawing,—

Fig. 1 is a front elevation of the remotely adjustable thermostat.

Fig. 2 is a diagram of the system for one room. In this view the components A and B represent sections on the lines A—A and B—B respectively of Fig. 1.

Fig. 3 shows a modification of the structure of the component B.

There are two sources of pressure fluid (compressed air). Source 5 supplies air at say 13 pounds gage and source 6 at say 17 pounds gage. The precise pressures are immaterial, provided they are different. A three-way valve 7 connects the sources selectively with supply line 8 which has branches as shown. One branch leads to bellows pressure motor 9 on base 10 which is opposed by the adjustable springs 11 whose strength is such that at 13 pounds gage the lever 12 is held in against the action of the motor 9 and at 17 pounds the motor 9 overpowers the springs and moves the lever 12 to its outermost limit of motion. A stop 13 defines the limits of motion.

Lever 12 has a pin and slot connection 14 with shaft 15 which extends across base 10 and turns in bearings 16. Shaft 15 underlies three thermostatic bars, a winter day (high temperature) bar 17, a winter night (low temperature) bar 18 and a summer bar 19. All three bars are arranged to flex inward (toward base 10) on rise of temperature.

Bar 17 is mounted on hinged saddle 21 and is adjusted by screw 22, for say 70° F. Bar 18 is mounted on hinged saddle 23 and is adjusted by screw 24, for say 55° F. Bar 19 is mounted on hinged saddle 25 and is adjusted by screw 26 for say 80° F. (subject, however, to modification by outdoor temperature as hereinafter explained).

Shaft 15 carries three cams 27, 28 and 29, so arranged that when lever 12 is in (low pressure) cam 27 frees day bar 17 and cams 28 and 29 force bars 18 and 19 out to inactive position, whereas when lever 12 is forced out cam 27 forces day bar 17 to inactive position and cams 28 and 29 free bars 18 and 19 so that they are conditioned to operate.

Bars 17 and 18 are thus in their operative condition in alternation with one another and act in closing thrust relation with a single lid 31 pivoted at 32 and biased in an opening direction by weight 33. Lid 31 controls leak port 34.

Bar 19 acts in opening thrust relation with an arm 35 on lid 36 which is pivoted at 37 and controls leak port 38. The lid 36 is biased in a closing direction by its own weight.

In a simplified embodiment of the invention, leak port 38 would be fixed but in the example illustrated it is carried by lever 41 fulcrumed at 42 on frame 10 so as to be adjustable by outdoor temperature. The purpose is to control summer cooling in relation to outdoor temperature.

To effect such adjustment an outdoor pneumatic thermostat 43 of known form receives air through a branch of line 8 and as outdoor temperature varies establishes a varying pressure in line 44 which leads to bellows 45 on base 10. As pressure in bellows 45 varies lever 46 fulcrumed at 47 on base 10 shifts and transmits motion to lever 41 through the adjustable thrust lug 48. Springs 49 bias lever 46 inward. The innermost position of lever 46 is so limited that thermostat 19 will have a minimum operating setting, say 70° or 75°.

Leak ports 34 and 38 are both connected to tube 51, port 38 being connected through a flexible tube 52 which serves as a spring to bias lever 41 toward lever 46.

Tube 51 leads to the controlling chamber 53 of a relay of the type shown in Otto Patent 1,500,260, July 8, 1924. Chamber 53 is supplied with air at a rate lower than the venting capacity of either leak port 34 or leak port 38 from line 8 past needle valve 54. The differential diaphragms 55, 56, operate the inlet and exhaust valve mechanism indicated at 57 to establish in chamber 58 and connected branch line 59 a pressure which varies with the pressure in chamber 53. This Johnson intermediate relay is well known in the art and is more elaborately described in said patent.

Branch line 59 leads to the motor chamber 61 of diaphragm actuated valve 62, 63, closing the valve progressively on rise of pressure in line 59.

Valve 62 controls the flow of heating fluid in winter and of cooling fluid in summer. It merely typifies control means for two diverse fluids used at different times. It is not essential that a single valve be used to control the two fluids, for it is known in the art to control similarly by one variable pressure two or more distinct valves. One valve is selected as the simplest typical controller for purpose of illustration.

Instead of the pneumatic thermostat 43 the arrangement of Fig. 3 may be adopted in which a thermostatic bulb 43a containing a suitable volatile liquid is connected by tube 44a with motor bellows 45a to actuate lever 46.

The outdoor thermostat 43 or 43a may be arranged to respond to dry bulb temperature, wet bulb temperature, or a combination of both according to known principles.

*Operation*

Under daytime winter conditions (heating to occupancy temperature) low pressure source 5 is connected to line 8, so that thermostat 17 controls and thermostats 18 and 19 are both forced out to inactive position. The effect is to put bar 17 into control of lid 31 and leave lid 36 closed. Hence the opening and closing of leak port 34 by bar 17 and lid 31 controls valve 62 through the relay.

Under nighttime winter conditions (heating to non-occupancy temperature) and under summer conditions (cooling day or night) high pressure source 6 is connected to line 8, so that thermostat 17 is forced back to inactive position and thermostats 18 and 19 are both free to act. It is understood of course that in winter valve 62, 63 controls a heating medium and in summer a cooling medium.

The thermostats 18 and 19 do not conflict. Thermostat 18 closes the normally open lid 31 against leak port 34 if temperature rises above the low setting (assumed to be 55°). Thermostat 19 moves the normally closed lid to open leak port 38 if temperature rises above the summer setting (which with or without outdoor adjustment would range around 80°). Hence between 55° and about 80° both leak ports 34 and 38 are closed. Only in winter would the temperature tend to pass the low limit, and only in summer the high. Hence both thermostats may be in their operative conditions and yet never conflict. On the contrary they would control selectively leak ports 34 and 38 either of which may control the relay when the other is closed.

The function of the relay is to accelerate response of the valve motor to the action of the leak ports. According to well known principles in the leak port thermostat art the relay can be dispensed with.

Certain features of the invention are capable of embodiment in thermostats of other than pneumatic type, and a number of modifications in the specific embodiment are also possible and fall within the scope of the invention.

An important example of this is the possible omission of the cam 27, whose function is to render the day bar 17 inoperative at certain times. It is not strictly necessary that this be done if the bars be arranged as shown in Fig. 1, and if the characteristic temperatures which the bars seek to establish are sufficiently differentiated and are related substantially as described. Assume, therefore, that the structure is identical with that shown in Figs. 1 and 2, but that the cam 27 is omitted so that under no circumstances is the day bar 17 forced back to inoperative position.

The operation would be as follows:

Daytime winter conditions would be identical with those already described, for the bars 18 and 19 would be in their inoperative position and the bar 17 would exercise control.

Under nighttime winter conditions (heating to non-occupancy temperature) and under summer conditions (cooling day or night) all three thermostatic bars 17, 18, and 19 would be free to act, but since the bar 18 closes leak port 34 at all temperatures above the low setting, assumed to be 55°, the bar 17 can perform no additional function. At the temperature at which it would be effective to close leak port 34, this port is already closed by the bar 18. Hence there is no interference during winter conditions. Under summer conditions the same would be true. Above 55° the bar 18 would hold the leak port 34 closed, and even though the temperature does rise above the 70° setting of the bar 17, its function has already been performed by the bar 18. It follows that between 55° and 80° both the leak ports 34 and 38 are closed, and operative characteristics are exactly the same as those described with reference to Figs. 1 and 2.

With either form of the device, relation of the temperature adjustments of the three thermostatic bars is important, and a substantial differentiation between the control point of the bar 19 and the control point of bar 17 is desirable, because if, during winter heating conditions, the system is changed from day setting to night setting when the room temperature is above the control point of the bar 19, this bar would tend to exercise a reverse control and interfere with the proper functioning of the system. The differentiation should be sufficient to exceed the range of possible accidental overheating of the room. Under summer conditions, the room temperature should not be allowed to fall to the control point of the bar 18. Obviously with a control point of 55°, such a fall is hardly possible. As a matter of fact, the embodiment of the invention omitting the cam 27 is preferred because of its greater simplicity. There is no practical objection to the inclusion of the cam 27, and it is described to make clear that the inventive concept can be carried out by its use. It is deemed simpler to describe the invention including the cam and then explain the possibility of its omission. Otherwise it would be necessary to illustrate alternative constructions.

What is claimed is:—

1. The combination of motor operated valve means arranged to control a heating medium in winter and a cooling medium in summer, said valve being biased in an opening direction, and arranged to close progressively in proportion to the energization of its motor; and two thermostatic devices subject to temperatures induced by said media for controlling the energization of said motor operated valve means, the first of said devices which is suited to control the heating medium having a lower control point than the second of said devices which is suited to control the cooling medium, said thermostatic devices being so arranged that each acts to energize fully said motor in the temperature range between their respective control points, and they act selectively to deenergize said motor progressively as temperature passes outside said range in one or the other direction.

2. The combination of motor operated valve means arranged to control a heating medium in winter and a cooling medium in summer, said valve being biased in an opening direction, and arranged to close progressively in proportion to the energization of its motor; two thermostatic devices subject to temperatures induced by said media for controlling the energization of said motor operated valve means, the first of said devices which is suited to control the heating medium having a lower control point than the second of said devices which is suited to control the cooling medium, said thermostatic devices being so arranged that each acts to energize fully said motor in the temperature range between their respective control points, and they act selectively to deenergize said motor progressively as temperature passes outside said range in one or the other direction; and means responsive to an independently variable atmospheric condition for adjusting the control point of one of said thermostatic devices in a range so limited as to exclude the control point of the other.

3. The combination of motor operated valve means arranged to control a heating medium in winter and a cooling medium in summer; and two thermostatic leak valves subject to temperatures induced by said media, and connected to control said motor operated valve means, the first of said two valves which is suited to control the heating medium having a lower control point than the second of said two valves which is suited to control the cooling medium, said leak valves being so arranged that both are closed in the temperature range between their respective control points and they open selectively as temperature passes outside said range in one or the other direction.

4. The combination of motor operated valve means arranged to control a heating medium in winter and a cooling medium in summer; two thermostatic leak valves subject to temperatures induced by said media, and connected to control said motor operated valve means, the first of said two valves which is suited to control the heating medium having a lower control point than the second of said two valves which is suited to control the cooling medium, said leak valves being so arranged that both are closed in the temperature range between their respective control points and they open selectively as temperature passes outside said range in one or the other direction; and means responsive to an independently variable atmospheric condition for adjusting the control point of one of said thermostatic leak valves in a range so limited as to exclude the control point of the other.

5. The combination of motor operated valve means arranged to control a heating medium in winter and a cooling medium in summer; a fluid pressure relay controlling said valve means; and two thermostatic leak valves subject to temperatures induced by said media, and connected to control said relay one of said two valves which is suited to control the heating medium having a lower control point than the other of said two valves which is suited to control a cooling medium, said leak valves being so arranged that both are closed in the temperature range between their respective control points, and they open selectively as temperature passes outside said range in one or the other direction.

6. The combination of motor operated valve means arranged to control a heating medium in winter and a cooling medium in summer; two leak ports connected with said motor operated valve means; three thermostatic elements, the first and second being adjusted respectively for a high control point and a low control point, and being capable of selectively exercising control on the first leak port to regulate heating, and the third having a control point higher than the second and exercising control on the second leak port to regulate cooling, the second and third thermostatic elements being so arranged that in the temperature range between their control points each causes closing of its controlled leak port; and selector means operable to render the first thermostatic element operative while inhibiting operation of the second and third and ensuring closing of the second leak port, and alternatively permitting operation of at least the second and third.

7. The combination of motor operated valve means arranged to control a heating medium in winter and a cooling medium in summer; a normally open leak port and a normally closed leak port, each connected with said motor operated valve means; three thermostatic elements, the first and second being adjusted respectively for a high control point and a low control point and being capable of selectively exercising control on the normally open leak port to throttle the same for regulating the heating medium, and the third thermostatic element having a control point higher than the second and exercising control on the normally closed leak port to open the same for regulating the cooling medium, the second and third thermostatic elements being so arranged that in the temperature range between their control points both leak ports are closed; and selector means having two positions, in one of which the first thermostatic element alone is operative and in the other of which the second and third are operative.

8. In a pneumatic thermostat, the combination of a controlled device; two leak ports connected to control said device; a normally open valve controlling one of said leak ports; a normally closed valve controlling the other of said leak ports; three thermostatic elements, the first and second being arranged to act selectively to close said normally open valve and the third to open said normally closed valve on changes of temperature in a given direction; and pressure shiftable selector means serving to render the first element operative and the second and third inoperative in one position of said selector means, and in another position thereof to render at least the second and third operative.

9. The combination of valve means arranged to control a heating medium in winter and a cooling medium in summer; two thermostatic controllers having distinct control points, said controllers being subject to the temperatures induced by said media, and arranged selectively to control said valve means, the first thermostatic controller being arranged to cause progressive opening and closing of said valve means as temperature falls from and returns to the lower of said control points, and the second thermostatic controller being arranged to cause progressive opening and closing of said valve means as temperature rises from and returns to the higher of said control points, the controllers coacting to maintain said valve means closed when temperature is in the interval between said control points.

10. The combination of valve means arranged to control a heating medium in winter and a cooling medium in summer; two thermostatic controllers having distinct control points, said controllers being subject to the temperatures, induced by said media, and arranged selectively to control said valve means, the first thermostatic controller being arranged to cause progressive opening and closing of said valve means as temperature falls from and returns to the lower of said control points, and the second thermostatic controller being arranged to cause progressive opening and closing of said valve means as temperature rises from and returns to the higher of said control points, the controllers coacting to maintain said valve means closed when temperature is in the interval between said control points; and means responsive to an independently variable atmospheric condition for adjusting one of said control points in a range so limited as to exclude the other control point.

CARL A. OTTO.